United States Patent Office 2,980,712
Patented Apr. 18, 1961

2,980,712
ALLOPREGNANE-3β,17α-DIOL-11,20-DIONE AND THE PREPARATION THEREOF
Earl M. Chamberlin, Westfield, N.J., assignor to Merck & Co., Inc., Rahway, N.J., a corporation of New Jersey
No Drawing. Filed July 1, 1954, Ser. No. 440,851
15 Claims. (Cl. 260—397.45)

This invention is concerned with novel chemical compounds of the cyclopentanopolyhydrophenanthrene series and processes for preparing the same. More particularly, it relates to the novel compound, 3(β),17(α)-dihydroxy-11,20-diketoallopregnane, acyl derivatives thereof, and processes for the preparation of these compounds. This application is a continuation-in-part of copending applications Serial No. 225,287, filed May 8, 1951, and Serial No. 240,280, filed August 3, 1951.

The novel cyclopentanopolyhydrophenanthrene compounds, 3(β),17(α)-dihydroxy-11,20-diketoallopregnane and the 3-acyloxy derivatives thereof can be used as starting materials in the preparation of other valuable organic compounds, and particularly as starting materials for the preparation of cyclopentanopolyhydrophenanthrene compounds similar in structure to those of the adrenal cortex. Thus, by the application of methods known in the art, 3(β),17(α)-dihydroxy-11,20-diketoallopregnane can be converted to cortisone. For example, 3(β),17(α) - dihydroxy-11,20-diketoallopregnane can be oxidized to the corresponding 3-keto compound by reaction with chromium trioxide. The resulting 3,11,20-triketo-17(α) hydroxy allopregnane can be converted to 3,11,20-triketo-17(α)-hydroxy-21-acetoxy allopregnane by reaction with lead tetraacetate in glacial acetic acid. Upon reacting the 3,11,20-triketo-17(α)-hydroxy-21-acetoxy allopregnane with bromine to obtain the corresponding 2,4-dibromo derivative, treating this dibromo derivative with sodium iodide to form the Δ⁴-2-iodo-3-keto compound, and reacting the latter product with chromous chloride, Δ⁴-3,11,20-triketo-17α-hydroxy-21-acetoxy pregnene (cortisone acetate) is obtained. Alternatively, other methods known in the art can be employed to convert 3(β),17(α)-dihydroxy-11,20-diketo allopregnane to cortisone and other valuable steroid compounds.

In accordance with my invention, I have found that acyl derivatives of 3(β),17(α)-dihydroxy-11,20-diketoallopregnane can be synthesized from esters of 3(β)-hydroxy-11-ketoallobisnorcholanic acid by reactions indicated as follows:

wherein R represents an esterified carboxy group, and R₁ represents an acyl substituent.

In this synthesis, an ester of 3(β)-hydroxy-11-ketoallobisnorcholanic acid (I) is first reacted with an aryl Grignard reagent to form 3(β)-hydroxy-11-keto-20-allopregnanyl diphenyl carbinol, which on reaction with a suitable acylating agent is converted to 3(β)-acyloxy-11-keto alloetiocholanyl methyl diphenyl ethylene (III). Upon reacting this product (III) with ozone, 3(β)-acyloxy-11,20-diketoallopregnane (IV) is formed. The latter product is then reacted with an acylating agent to form the corresponding enol ester (V) which on reaction with an organic per-acid is converted to the desired 17(α)-hydroxy compound (VI).

In the first step of this synthesis, an aryl Grignard reagent, such as phenyl magnesium bromide, is reacted with an ester of 3(β)-hydroxy-11-ketoallobisnorcholanic acid to form 3(β)-hydroxy-11-keto-20-allopregnanyl diphenyl carbinol. This reaction is carried out under anhydrous conditions in a suitable solvent medium such as ether-benzene in the presence of N-ethyl morpholine. After the reaction is completed, the product can be isolated by acidifying the reaction mixture with an inorganic acid such as hydrochloric acid, then adjusting the pH to slight alkalinity by the addition of solid sodium carbonate, and steam distilling the resulting reaction mixture to remove the solvents. The crude residue so obtained may be used directly in the next step of the process, or, if desired, may be further purified by crystallization to isolate the pure carbinol.

In the next step of my process, the carbinol is simultaneously dehydrated and acylated to obtain 3(β)-acyloxy-11-keto alloetiocholanyl methyl diphenylethylene. I find that this reaction is most conveniently effected by refluxing the carbinol with a mixture of acetic acid and acetic anhydride.

The 3(β)-acyloxy-11-keto alloetiocholanyl methyl diphenyl ethylene dissolved in a suitable solvent, such as chloroform, is then subjected to ozonolysis at low temperatures to effect the degradation of the side chain and form 3(β)-acyloxy-11,12-diketoallopregnane.

The latter product is then treated with an acylating agent in the presence of an acid catalyst, whereby the 20-keto substituent is enolized to form the corresponding 20-enol acylate which is reacted with an organic per-acid, such as monperphthalic acid to form 3(β)-acyloxy-17(α)-hydroxy-11,20-diketoallopregnane. This product is then readily hydrolyzed with alkali to obtain 3(β),17(α)-dihydroxy-11,20-diketoallopregnane.

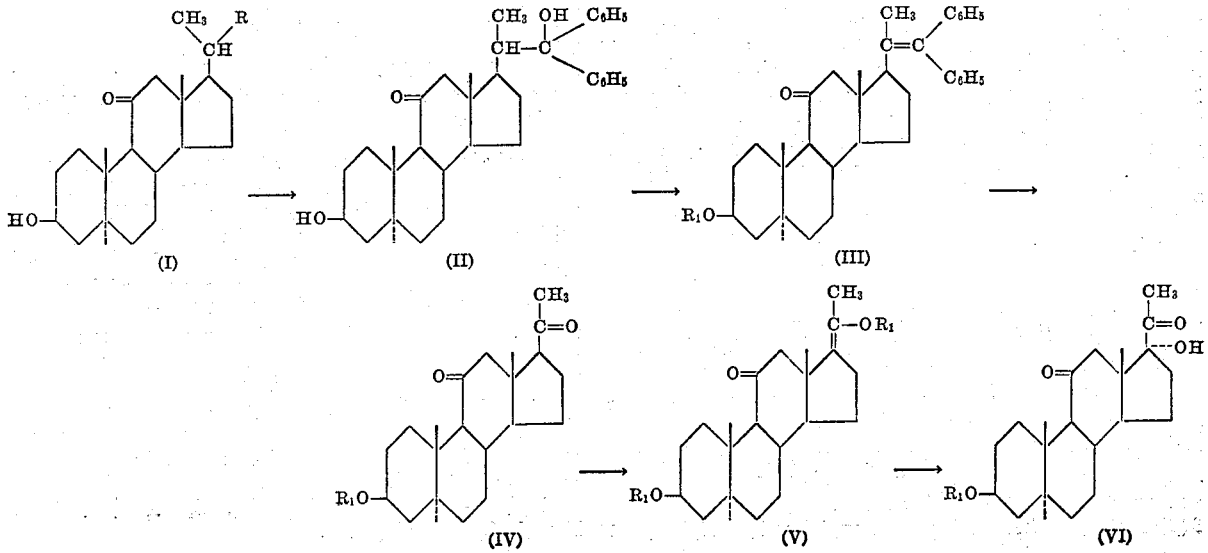

In carrying out the processes of the present invention, any ester of 3(β)-hydroxy-11-keto allobisnorcholanic acid can be used as the starting material, although, generally, I prefer to use an ester of a lower aliphatic alcohol since such esters are readily and conveniently prepared. Examples of preferred starting materials that might be mentioned are, methyl 3(β)-hydroxy-11-keto allobisnorcholanate, ethyl 3(β)-hydroxy-11-keto allobisnorcholanate, propyl 3(β)-hydroxy-11-keto allobisnorcholanate, and butyl 3(β)-hydroxy-11-keto allobisnorcholanate.

The step of converting 3(β)-hydroxy-11-keto-20-allopregnanyl diphenyl carbinol to 3(β)-acyloxy-11-keto-alloetiocholanyl methyl diphenyl ethylene is preferably effected by heating with a lower fatty acid, a lower fatty acid anhydride, or a mixture of the acid and the anhydride.

The step of converting 3(β)-acyloxy-11,20-diketo allopregnane to the corresponding enol ester is also preferably effected by heating with a lower fatty acid anhydride in the presence of a small amount an acid catalyst such as p-toluene sulfonic acid.

The following examples are presented as illustrative embodiments of my invention.

EXAMPLE 1

*Preparation of 3(β)-hydroxy-11-keto - 20 - allopregnanyl diphenyl carbinol from methyl-3(β)-hydroxy-11-keto-allobisnorcholanate*

Phenyl magnesium bromide was prepared in the usual manner from 3 g. of magnesium, 14 cc. of bromobenzene and 50 cc. dry absolute ether. To the ethereal solution of the Grignard reagent was added 23 cc. of dry N ethyl morpholine and 12 cc. of dry benzene followed by 4.7 g. of methyl 3(β)-hydroxy-11-ketoallobisnorcholanate (prepared as described in copending application Serial No. 215,026, filed March 10, 1951) dissolved in 23 cc. of dry N ethyl morpholine and 12 cc. of dry benzene. The ester solution was added to the Grignard reagent at 15° C. over a period of 45 minutes. After the addition was complete an additional 23 cc. of dry N ethyl morpholine and 12 cc. of dry benzene was added. The reaction mixture was stirred at room temperature for 4 days and then for 6 hours at 50–55° C. After standing overnight the reaction mixture was poured onto 500 g. of ice and 71 cc. of concentrated hydrochloric acid. The pH was adjusted to slight alkalinity by the addition of solid sodium carbonate and the heterogenous mixture steam distilled 4 hours after all the solvent was removed. The solidified crude product was filtered off and taken up in a liter of hot benzene. The warm benzene solution was washed successively with 100 cc. of water, 100 cc. 2.5 N sodium hydroxide and finally with water. The washed benzene solution was dried over anhydrous magnesium sulfate, concentrated in vacuo to the point of crystallization, cooled, and filtered to yield 3.2 g. of 3(β)-hydroxy-11-keto-20-allopregnanyl diphenyl carbinol, melting at 239.5–240.5° C., and having a specific rotation of $[\alpha]_D^{23} = -22.5$ in chloroform.

A small sample recrystallized from methanol melted at 244.5–249° C.

*Analysis.*—Calc'd for $C_{34}H_{44}O$: C, 81.55; H, 8.86. Found: C, 81.79; H, 8.96.

EXAMPLE 2

*Preparation of 3(β)-acetoxy - 11 - keto - alloetiocholanyl methyl diphenyl ethylene from 3(β)-hydroxy-11-keto allopregnanyl diphenyl carbinol*

A solution of 2.4 g. of 3(β)-hydroxy-11-keto allopregnanyl diphenyl carbinol in 50 cc. of glacial acetic acid, was refluxed for 3 hours, then 25 cc. of acetic anhydride was added and the refluxing continued for another 3 hours. On cooling the acetylated compound, 3(β)-acetoxy-11-keto alloetiocholanyl methyl diphenyl ethylene, melting at 263.5–266° C. crystallized out. A small sample recrystallized from methanol-chloroform melted at 267–268.5° C., and had a U.V. absorption of λmax. 2440 uE% 237 in alcohol. Specific rotation $[\alpha]_D^{23} = +228$ in chloroform.

*Analysis.*—Calc'd for $C_{36}H_{44}O_3$: C, 82.40; H, 8.45. Found: C, 82.27; H, 8.56.

EXAMPLE 3

*Preparation of 3(β)-acetoxy-11-keto alloetiocholanyl methyl diphenyl ethylene from 3-hydroxy-11-keto allobisnorcholanate*

Phenyl magnesium bromide was prepared in the usual manner from 1.5 g. of magnesium, 7 cc. of bromobenzene and 35 cc. of dry absolute ether. To the solution of Grignard reagent was added 6 cc. of dry benzene and 12 cc. of dry N ethyl morpholine. Ether was then distilled off. The resultant pasty mass was cooled to 10° C. and 2.3 g. of methyl 3(β)-hydroxy-11-ketoallobisnorcholanate dissolved in 6 cc. of dry benzene and 12 cc. of dry N ethyl morpholine was added to the Grignard reagent, keeping the temperature between 10–15° C. The reaction mixture was then stirred at room temperature for 3 days.

The resulting reaction mixture was decomposed by pouring it onto 125 g. of ice and 39 cc. of concentrated hydrochloric acid. The aqueous layer was separated and extracted three times with 75 cc. benzene. The combined benzene extracts were steam distilled for 4 hours after all the solvent had been removed. The product was removed from the aqueous layer and taken up in benzene, dried over anhydrous magnesium sulfate and the benzene removed in vacuo. The crude 3(β)-hydroxy-11-keto-20-allopregnanyl carbinol so obtained was dehydrated by refluxing 3 hours with 75 cc. glacial acetic acid. The acetic acid was removed in vacuo, the residue dissolved in ether, washed with water, dried over anhydrous magnesium sulfate and concentrated in vacuo. The residue was saponified with 5% methanolic potassium hydroxide poured into water and extracted with ether. The ether was dried over anhydrous magnesium sulfate and evaporated on the steam bath. The residue was acetylated in 15 cc. dry pyridine and 5 cc. of acetic anhydride. The acetylation solution was diluted with water and the product which precipitated was taken up in ether. The ether was dried over anhydrous sodium carbonate after washing with 2.5 N hydrochloric acid and water. The solvent was evaporated on the steam bath and the residue recrystallized from methanol to yield impure 3(β) - acetoxy - 11 - ketoalloetiocholanyl methyl diphenyl ethylene melting at 254–255° C., and having a U.V. absorption of λmax. (alcohol) 2450 E% 205.

EXAMPLE 4

*Preparation of 3(β)-acetoxy-11,20-diketo allopregnane from 3(β)-acetoxy-11-keto alloetiocholanyl methyl diphenyl ethylene*

A solution of 1.5 g. of 3(β)-acetoxy-11-keto alloetiocholanyl methyl diphenyl ethylene in 100 cc. of chloroform was ozonized at −50° to −70° C. The resulting ozonized solution was stirred 25 minutes with 2 g. of zinc dust and 5 cc. of glacial acetic acid. After filtration of the zinc the solvent was removed in vacuo and the residue steam distilled for 4 hours. The product was taken up in ether, dried over anhydrous magnesium sulfate and the solvent evaporated on a steam bath. The residue crystallized on moistening with methanol and standing in the ice box. Recrystallized from aqueous methanol the 3(β)-acetoxy-11,20-diketo allopregnane melted at 141–143° C., and had a specific rotation of $[\alpha]_D^{23} = +88$ in chloroform.

*Analysis.*—Calc'd for $C_{24}H_{34}O_3$: C, 73.76; H, 9.15. Found: C, 73.79; H, 8.90.

Melting point of 3.5 dinitrophenyl hydrazone derivative 234–235° C.

Analysis.—Calc'd for $C_{29}H_{37}O_7$: C, 62.91; H, 6.74; N, 10.12. Found: C, 62.93; H, 6.90; N, 10.13.

EXAMPLE 5

*Preparation of 3(β),17(α)-dihydroxy-11,20-diketo allopregnane from 3(β)-acetoxy-11,20-diketo allopregnane*

A solution of 1.4 g. of 3(β)-acetoxy-11,20-diketo allopregnane in 10 cc. of acetic anhydride was heated for 4 hours on the steam bath with 250 mgs. p-toluene sulfonic acid monohydrate. The reaction mixture was poured onto ice in a separatory funnel and extracted twice with 100 cc. of ethyl acetate. The ethyl acetate was washed with sodium bicarbonate solution and saturated sodium chloride solution. The ethyl acetate solution was dried over anhydrous magnesium sulfate and concentrated to small volume. Fifteen cubic centimeters of 0.53 M monoperphthalic acid solution were added and the reaction mixture allowed to stand overnight.

The resulting mixture was diluted with 75 cc. of ethyl acetate and the excess per-acid washed out with 0.5 N sodium hydroxide and finally with water. The ethyl acetate solution was then dried with anhydrous magnesium sulfate and concentrated in vacuo. The residue was hydrolyzed in 5% methanolic potassium hydroxide at room temperature. Crystalline material deposited which was filtered off and the filtrate diluted with 500 cc. of water which was then acidified and extracted 3 times with 50 cc. of chloroform. The chloroform extract was dried over anhydrous sodium carbonate and evaporated on the steam bath to yield 3(β),17(α)-dihydroxy-11,20-diketo allopregnane. Recrystallized from methanol the product melted at 290–292° C.

*Anal.*—Calc'd for $C_{21}H_{32}O_4$: C, 72.38; H, 9.26. Found: C, 72.98; H, 9.74.

In accordance with the procedures described in detail in copending application Serial No. 240,280, filed August 3, 1951, the 3,17-dihydroxy-11,20-diketo-allopregnane thus obtained is converted to 3,11,20-triketo-17-hydroxy-21-acetoxy-allopregnane by reacting the 3,17-dihydroxy-11,20-diketo-allopregnane with bromine, thereby forming 3,17-dihydroxy-11,20-diketo-21-bromo-allopregnane, reacting this 21-bromo-allopregnane compound with an alkali metal acetate, thereby forming 3,17-dihydroxy-11,20-diketo-21-acetoxy-allopregnane. The latter compound is reacted with an oxidizing agent to produce the desired 3,11,20-triketo-17-hydroxy-21-acetoxy-allopregnane.

In carrying out the reaction of this 3,17-dihydroxy-11,20-diketo-allopregnane with bromine it is ordinarily preferred to bring the reactants into intimate contact in a liquid medium, preferably in a halogenated hydrocarbon solvent inert to bromine such as chloroform, and the like. The reaction is preferably carried out at a temperature of approximately 45–50° C., and the reaction is allowed to proceed substantially to completion as evidenced by the fading of the bromine coloration of the solution. The brominated reaction solution is then ordinarily extracted with an aqueous alkaline solution to remove acidic by-products, and the organic layer is then evaporated in vacuo to yield the intermediate 3,17-dihydroxy-11,20-diketo-21-bromo-allopregnane which can be purified, if desired, by recrystallization from an organic solvent such as acetonitrile.

The 3,17-dihydroxy-11,20-diketo-21-bromo-allopregnane is then reacted with an alkali metal acetate, preferably in solution in an organic solvent such as acetone. It is ordinarily preferred to dissolve the 3,17-dihydroxy-11,20-diketo-21-bromo-allopregnane in acetone and then to add to the solution a mixture of potassium bicarbonate, glacial acetic acid, and potassium iodide, the potassium iodide serving as a catalyst for the reaction. The resulting mixture is then heated at an elevated temperature, preferably under reflux, for a period of about four hours, at the end of which time the acetone is evaporated, and the residual material is triturated with water to give the desired 3,17-dihydroxy-11,20-diketo-21-acetoxy-allopregnane.

The 3,17-dihydroxy-11,20-diketo-21-acetoxy-allopregnane is then reacted with an oxidizing agent, preferably N-bromoacetamide. This reaction is conveniently carried out by dissolving the 3,17-dihydroxy-11,20-diketo-21-acetoxy-allopregnane in a lower aliphatic alcohol, such as methanol, containing a small amount of a tertiary amine, such as pyridine, and adding to the resulting solution a solution of the N-bromoacetamide in the lower aliphatic alcohol. The resulting mixture is allowed to stand, preferably for about twelve hours, to effect oxidation of the 3-hydroxy substituent. The reaction mixture is then treated with a reducing agent, such as allyl alcohol, to destroy excess N-bromoacetamide, and the mixture is then acidified with an aqueous solution of a mineral acid. The acidified solution is then triturated with water, thereby precipitating the desired 3,11,20-triketo-17-hydroxy-21-acetoxy-allopregnane which can be further purified, if desired, by recrystallization from an organic solvent such as acetone. This 3,11,20-triketo-17-hydroxy-21-acetoxy-allopregnane is then converted to cortisone acetate in accordance with the procedures set forth in Nature, 168, page 28 (July 1951).

Various changes and modifications may be made in carrying out the present invention without departing from the spirit and scope thereof. Insofar as these changes and modifications are within the purview of the annexed claims, they are to be considered as part of my invention.

I claim:

1. An allopregnane compound of the formula

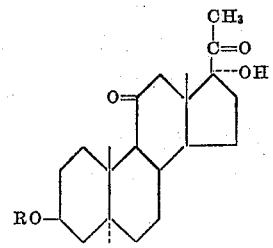

wherein R is a substituent from the group consisting of hydrogen and lower fatty acid radicals.

2. 3(β)-acyloxy-17(α)-hydroxy-11,20-diketo allopregnane wherein the acyl group is a lower fatty acid radical.

3. 3(β)-acetoxy-17-(α)-hydroxy-11,20-diketo allopregnane.

4. 3(β),17(α)-dihydroxy-11,20-diketo allopregnane.

5. 3(β)-acyloxy-11,20-diketo allopregnane wherein the acyl group is a lower fatty acid radical.

6. 3(β)-acetoxy-11,20-diketo allopregnane.

7. 3(β)-hydroxy-11,20-diketo allopregnane.

8. The process for preparing 3(β)-acyloxy-17(α)-hydroxy-11,20-diketo allopregnane which comprises reacting an ester of 3(β)-hydroxy-11-keto allobisnorcholanic acid with an aryl Grignard reagent, treating the resulting reaction product with a dehydrating agent, cleaving the resulting product by treatment with ozone, reacting the resulting 20-keto pregnane with an acylating agent in the presence of an acid catalyst to form $\Delta^{17}$-3(β),20-diacyloxy-11-ketoallopregnene and treating the 20-enol acylate with an organic per-acid.

9. The process for preparing 3(β)-acetoxy-17(α)-hydroxy-11,20-diketo allopregnane which comprises reacting methyl 3(β)-hydroxy-11-keto allobisnorcholanate with phenyl magnesium bromide, heating the resulting reaction product with a mixture of acetic acid and acetic anhydride, treating the reaction product with ozone, reacting the ozonized product with acetic anhydride in the presence of p-toluene sufonic acid to form $\Delta^{17}$-3($\beta$),20-diacetoxy-11-ketoallopregnene, and treating this product with perphthalic acid.

10. The process for preparing 3($\beta$)-acyloxy-11,20-diketo allopregnane which comprises reacting an ester of 3($\beta$)-hydroxy-11-keto allobisnorcholanic acid with an aryl Grignard reagent, treating the resulting di-aryl carbinol with a dehydrating agent, and subjecting the resulting product to ozonolysis.

11. The process for preparing 3($\beta$)-acetoxy-11,20-diketo allopregnane which comprises reacting methyl 3($\beta$)-hydroxy-11-keto allobisnorcholanate with phenyl magnesium bromide, heating the resulting reaction product with a mixture of acetic acid and acetic anhydride, and treating the resulting dehydrated product with ozone.

12. The process for preparing 3($\beta$)-acyloxy-17($\alpha$)-hydroxy-11,20-diketo allopregnane which comprises reacting 3($\beta$)-acyloxy-11,20-diketo allopregnane with an acylating agent in the presence of an acid catalyst to form $\Delta^{17}$ - 3($\beta$),20-diacyloxy-11-ketoallopregnene, and treating this product with an organic per-acid.

13. The process for preparing 3($\beta$)-acetoxy-17($\alpha$)-hydroxy-11,20-diketo allopregnane which comprises reacting 3($\beta$)-acetoxy-11,20-diketo allopregnane with acetic anhydride in the presence of toluene sulfonic acid, and treating the resulting product with perphthalic acid.

14. A process for the production of allopregnane-3$\beta$,17$\alpha$-diol-11,20-dione which comprises treating a lower fatty acid ester of allopregnane-3$\beta$-ol-11,20-dione with a lower fatty acid anhydride to form the corresponding $\Delta^{17}$-20-enol acylate, and subjecting said $\Delta^{17}$-20-enol acylate to the action of an aromatic per acid followed by treatment with a saponifying agent.

15. A process for the production of allo-pregnane-3$\beta$,17$\alpha$-diol-11,20-dione which comprises treating allopregnane-3$\beta$-ol-11,20-dione 3-acetate with acetic anhydride in the presence of toluene sulfonic acid, and treating the resulting product with perphthalic acid followed by a saponifying agent.

References Cited in the file of this patent

Chamberlin et al.: Journal Am. Chem. Soc., 73, 4025–4053 (1951).

Rosenkranz et al.: Journal Am. Chem. Soc., 73, 4055–4056 (1951).